(12) United States Patent
Watanabe et al.

(10) Patent No.: US 11,682,112 B2
(45) Date of Patent: Jun. 20, 2023

(54) INSPECTION DEVICE AND MACHINE LEARNING METHOD

(71) Applicant: FANUC Corporation, Yamanashi (JP)

(72) Inventors: Keisuke Watanabe, Yamanashi (JP); Yasuhiro Shibasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 952 days.

(21) Appl. No.: 16/566,884

(22) Filed: Sep. 11, 2019

(65) Prior Publication Data

US 2020/0082225 A1    Mar. 12, 2020

(30) Foreign Application Priority Data

Sep. 12, 2018   (JP) .............................. JP2018-170911

(51) Int. Cl.
| | | |
|---|---|---|
| *G06T 7/00* | (2017.01) | |
| *G06N 20/00* | (2019.01) | |
| *G06F 18/21* | (2023.01) | |
| *G06F 18/2413* | (2023.01) | |
| *G06N 3/08* | (2023.01) | |
| *G06V 10/774* | (2022.01) | |
| *G06V 10/776* | (2022.01) | |

(52) U.S. Cl.
CPC ........ *G06T 7/0004* (2013.01); *G06F 18/2185* (2023.01); *G06F 18/2413* (2023.01); *G06N 3/08* (2013.01); *G06N 20/00* (2019.01); *G06V 10/774* (2022.01); *G06V 10/776* (2022.01)

(58) Field of Classification Search
None
See application file for complete search history.

(56) References Cited

U.S. PATENT DOCUMENTS

| | | | |
|---|---|---|---|
| 4,580,226 A | * | 4/1986 | Bennison ................ G07C 3/14 700/219 |
| 2006/0010166 A1 | * | 1/2006 | Lin ........................ G06Q 30/06 |
| 2007/0265743 A1 | | 11/2007 | Kojitani et al. |
| 2011/0182495 A1 | * | 7/2011 | Sun .......................... G06T 7/48 382/141 |

(Continued)

FOREIGN PATENT DOCUMENTS

| | | |
|---|---|---|
| CN | 101071076 A | 11/2007 |
| JP | 2002268742 A | 9/2002 |

(Continued)

*Primary Examiner* — Bernard Krasnic
(74) *Attorney, Agent, or Firm* — Hauptman Ham, LLP (57) ABSTRACT

Disclosed is an inspection device including: a machine learning device that performs machine learning on the basis of state data acquired from an inspection target and label data indicating an inspection result related to the inspection target to generate a learning model; a learning model evaluation index calculation unit that calculates a learning model evaluation index related to the learning model generated by the machine learning device as an evaluation index used to evaluate the learning model; an inspection index acquisition unit that acquires an inspection index used in an inspection; and an index value determination unit that determines whether the learning model generated by the machine learning device satisfies the inspection index on the basis of the learning model evaluation index and the inspection index and outputs a result of the determination.

4 Claims, 3 Drawing Sheets

(56) References Cited

U.S. PATENT DOCUMENTS

| | | | |
|---|---|---|---|
| 2014/0050389 A1* | 2/2014 | Mahadevan | G06K 9/6254 |
| | | | 382/149 |
| 2014/0314302 A1 | 10/2014 | Minato et al. | |
| 2021/0229231 A1* | 7/2021 | Fukatsu | G05B 19/406 |

FOREIGN PATENT DOCUMENTS

| | | | | |
|---|---|---|---|---|
| JP | 2005-52926 A | | 3/2005 | |
| JP | 2006293820 A | | 10/2006 | |
| JP | 2007327937 A | | 12/2007 | |
| JP | 2010211468 A | | 9/2010 | |
| JP | 2010249547 A | | 11/2010 | |
| JP | 2013015964 A | * | 1/2013 | |
| JP | 2013-140090 A | | 7/2013 | |
| JP | 2014206415 A | * | 10/2014 | H01G 2/14 |
| JP | 2015-21756 A | | 2/2015 | |
| JP | 2017-49974 A | | 3/2017 | |

* cited by examiner

INSPECTION DEVICE AND MACHINE LEARNING METHOD

RELATED APPLICATIONS

The present application claims priority to Japanese Patent Application Number 2018-170911 filed Sep. 12, 2018, the disclosure of which is hereby incorporated by reference herein in its entirety.

BACKGROUND OF THE INVENTION

1. Field of the Invention

The present invention relates to an inspection device and a machine learning method.

2. Description of the Related Art

Conventionally, appearance inspections have been performed in which operators visually confirm the appearance of products manufactured at manufacturing sites such as factories to classify the products into non-defective products and defective products having scratches, cracks, or the like. In such appearance inspections, inspection accuracy could fluctuate because the determination reference is different depending on the levels of experience of operators, or because inspections are performed with lack of concentration due to changes in physical conditions. In such cases, non-defective products could be extracted from manufacturing lines as defective products. Therefore, at many sites, products determined to be defective products and temporarily removed from manufacturing lines are confirmed again by other persons in charge of inspections. As a result of the confirmation, products determined to be non-defective products are returned to the manufacturing lines again. Thus, reduction in manufacturing yields is prevented. In a similar manner, workpieces determined to be non-defective products by operators could actually be defective products. In this case, the defective products are shipped as non-defective products. Therefore, at manufacturing sites, various countermeasures are taken to reduce the rate of defective products included in shipped products (defective product shipping rate) to a greater extent.

Generally, it is important to reduce two indexes to automate appearance inspections at manufacturing sites. The first index is the above mentioned "defective product shipping rate," and the second index is a "re-inspection rate." The re-inspection rate indicates the rate of the number of products excluded from manufacturing lines as defective products to the number of products manufactured in the manufacturing lines. That is, a reduction in the re-inspection rate indicates reducing an operation frequency of the confirmation operations for reconfirming whether products to be handled as non-defective products have been included in products removed from manufacturing lines as defective products. These indexes depend on the number of defective products relative to the total number of manufactured inspection targets ("manufacturing defective rate"). Therefore, if the "manufacturing defective rate" of a certain manufacturing line is known, it is only required to construct an inspection device capable of performing an inspection satisfying a maximum "defective product shipping rate" (limit defective product shipping rate) and a maximum "re-inspection rate" (limit re-inspection rate indicating the number of inspection targets excluded from an inspection to the total number of inspection targets).

Meanwhile, as an attempt to improve accuracy in an automated appearance inspection, an inspection is performed in which an image of the appearance of a product is captured by an image-capturing unit and the product is sorted on the basis of the captured image. Further, an appearance inspection in which a product is mechanically classified into a non-defective product and a defective product on the basis of a captured image has been performed (see, for example, Japanese Patent Application Laid-open No. 2015-021756, Japanese Patent Application Laid-open No. 2005-052926, and Japanese Patent Application Laid-open No. 2013-140090). In such a mechanical appearance inspection, feature points are extracted from a reference image prepared in advance. Next, the feature points extracted from the reference image are compared with feature points extracted from a captured image of a product. Finally, the product is sorted or selected on the basis of a result of the comparison. Further, cases in which machine learning is introduced into such a mechanical appearance inspection has increased (for example, Japanese Patent Application Laid-open No. 2017-049974).

Generally, in machine learning, particularly deep learning using a neural network having three or more layers, a learning model is generated in a learning cycle called iterations or epochs. Further, a learning model is generated every time a calculation of a certain number of cycles is performed. This is because deep learning has a property in which the quality of a learning model is not improved unlimitedly as the learning is advanced. That is, a learning model that has performed learning to a certain number of cycles or more could be put into a state called overfitting. The learning model in this state is not able to output a correct result with respect to unknown data. Therefore, in deep learning, multiple learning models are generated in a learning process, and each of the learning models is evaluated. Then, an optimum learning model is selected from among the evaluated learning models. In the evaluation of the learning models, a value such as "loss" (an error between an output value of a neural network and an answer given by training data) or "accuracy" (the correct answer rate of an output value of the neural network) at the time of learning is used. Further, "precision" (the rate of actually-correct data to data predicted to be correct) or "recall" (the rate of correctly-found data to data to be found) at the time of evaluating verification data may be used.

However, when machine learning is used in an appearance inspection at a manufacturing site, a learning model is required to satisfy each of evaluation criteria (specifications requested by a user) used at the site such as the above mentioned defective product shipping rate and the re-inspection rate. That is, even if a determination is made as to whether a learning result is good or bad on the basis of the evaluation criterion of a general learning model, it is unknown that the evaluation criterion requested on site is satisfied. For example, even if the "loss" indicating one of indexes at the time of learning reduces, an expected defective product shipping rate may not be necessarily achieved by the learning model. That is, a method for easily understanding or calculating values of the above mentioned "loss" and the "accuracy" with which the "defective product shipping rate" and the "re-inspection rate" satisfy on-site requirements has not been proposed.

Accordingly, the objective of the present disclosure is to provide an inspection device and a machine learning method that make it easier for users at manufacturing sites to select a learning model satisfying required specifications.

SUMMARY OF THE INVENTION

In the present disclosure, an inspection device employs a configuration that determines whether a learning model is good or bad on the basis of the relationship between an index value for evaluating the performance of the learning model and an index value required on site with respect to an inspection device, and that selects the learning model on the basis of a result of the determination to solve the above problem.

According to an aspect of the present disclosure, provided is an inspection device that performs an inspection of an inspection target, the inspection device including: a machine learning device that performs machine learning on the basis of state data acquired from the inspection target and label data indicating an inspection result related to the inspection target to generate a learning model; a learning model evaluation index calculation unit that calculates a learning model evaluation index related to the learning model generated by the machine learning device as an evaluation index used to evaluate the learning model; an inspection index acquisition unit that acquires an inspection index to be used in the inspection; and an index value determination unit that determines whether the learning model generated by the machine learning device satisfies the inspection index on the basis of the learning model evaluation index and the inspection index and outputs a result of the determination.

According to another aspect of the present disclosure, provided is a machine learning method including: a first step of performing machine learning on the basis of state data acquired from an inspection target and label data indicating an inspection result related to the inspection target to generate a learning model; a second step of calculating a learning model evaluation index that is related to the learning model generated in the first step as an evaluation index used to evaluate the learning model; a third step of acquiring an inspection index used in an inspection; and a fourth step of determining whether the learning model generated in the first step satisfies the inspection index on the basis of the learning model evaluation index and the inspection index and outputting a result of the determination.

According to the present disclosure, it is possible to determine the evaluation of a learning model on the basis of required specifications fixed as inspection indexes. Therefore, in the learning process of a machine learning device, even an operator on site having no knowledge about machine learning is allowed to determine whether learning has been performed to satisfy required specifications fixed as currently-set inspection indexes and easily select an appropriate learning model.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Hereinafter, embodiments of the present disclosure will be described with reference to the drawings.

Figure 1:
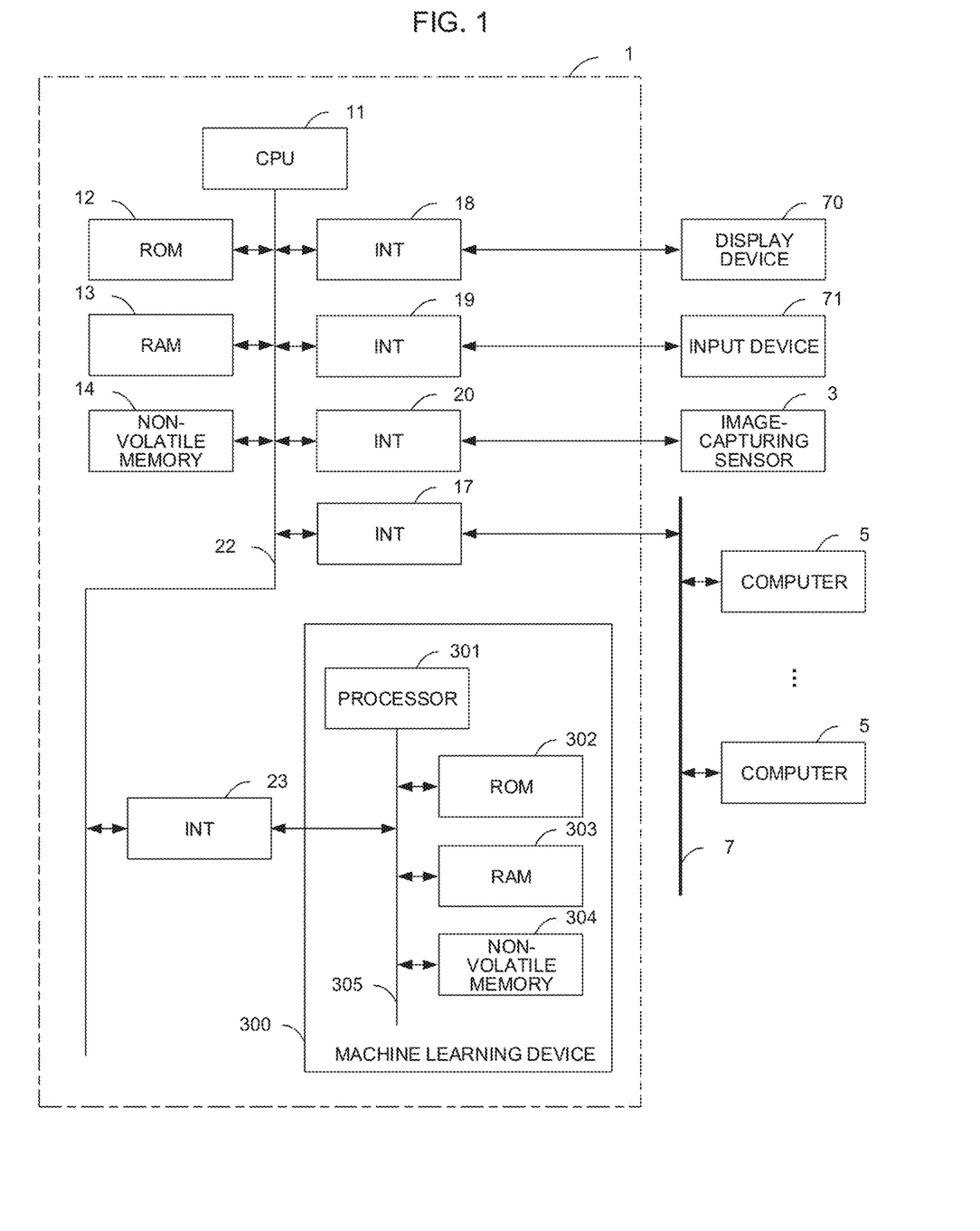
FIG. 1 is a schematic hardware configuration diagram showing an inspection device according to an embodiment.

FIG. 1 is a schematic hardware configuration diagram showing an inspection device according to an embodiment of the present disclosure. An inspection device 1 of the present embodiment is implemented in, for example, a computer installed on a product inspection site in a factory. Further, the inspection device 1 may be implemented as a computer such as a cell computer, a host computer, an edge computer, and a cloud server connected to a computer installed on a product inspection site in a factory via a network. FIG. 1 shows an example of a case in which the inspection device 1 is implemented in a computer installed on a product inspection site in a factory.

A central processing unit (CPU) 11 provided in the inspection device 1 according to the present embodiment is a processor that entirely controls the inspection device 1. The CPU 11 reads a system program stored in a read only memory (ROM) 12 connected via a bus 22. The CPU 11 controls the entire inspection device 1 according to the system program. In a random access memory (RAM) 13, temporary calculation data or display data to be displayed on a display device 70 is stored. Further, in the RAM 13, various data or the like input by an operator via an input device 71 is stored via an interface 19.

A non-volatile memory 14 is constituted by, for example, a static random access memory (SRAM), a solid state drive (SSD), or the like backed up by a battery not illustrated. The non-volatile memory 14 is a memory that maintains its storage state even if the power of the inspection device 1 is turned off. In the non-volatile memory 14, data or a program input via the input device 71 is stored. Further, in the non-volatile memory 14, image data or the like of an inspection target captured by an image-capturing sensor 3 via an interface 20 is stored. The data, the program, or the like stored in the non-volatile memory 14 may be loaded into the RAM 13 when used. Further, in the ROM 12, a system program for performing processing related to an inspection or a system program for performing other required processing is written in advance.

The image-capturing sensor 3 is an electronic camera having an imaging element such as a charge coupled device (CCD). The image-capturing sensor 3 is a well-known light-receiving device having a function of detecting a two-dimensional image or a distance image on an imaging surface (CCD array surface) by capturing an image. The image-capturing sensor 3 is attached to, for example, a hand of a robot not illustrated. The image-capturing sensor 3 is moved by the robot to an imaging position at which an image of an inspection target is to be captured. The image-capturing sensor 3 sends image data obtained by capturing an image of the inspection target to the CPU 11 via the interface 20. The image-capturing sensor 3 may be fixedly installed at, for example, a predetermined position. In this case, the inspection target held by the hand of the robot is moved to a position at which capturing of an image of the inspection target by the image-capturing sensor 3 is allowed. Thus, the image-capturing sensor 3 is allowed to capture an image of the inspection target. Control related to the capturing of an image of the inspection target by the image-capturing sensor 3 may be performed when the inspection device 1 performs a program, or may be performed by a robot controller that controls the robot or control by other devices.

An interface 17 connects the inspection device 1 to a wired/wireless network 7. The network 7 is connected to a computer 5 such as a personal computer, a cell computer, an edge computer, and a host computer installed side by side with a machine tool installed in a factory. The inspection device 1 and the computer 5 exchange information with each other via the network 7.

An interface 23 connects the bus 22 of the inspection device 1 and a machine learning device 300 to each other. In the machine learning device 300, a processor 301 that controls the entire machine learning device 300, a ROM 302 that stores a system program or the like, a RAM 303 that temporarily stores data in each processing related to machine learning, and a non-volatile memory 304 that is used to store a learning model or the like are connected to each other via a bus 305. The machine learning device 300 observes each information acquirable by the inspection device 1 via the interface 23. Further, the inspection device 1 performs subsequent processing on the basis of the inference of an inspection result related to an inspection target output from the machine learning device 300.

Figure 2:
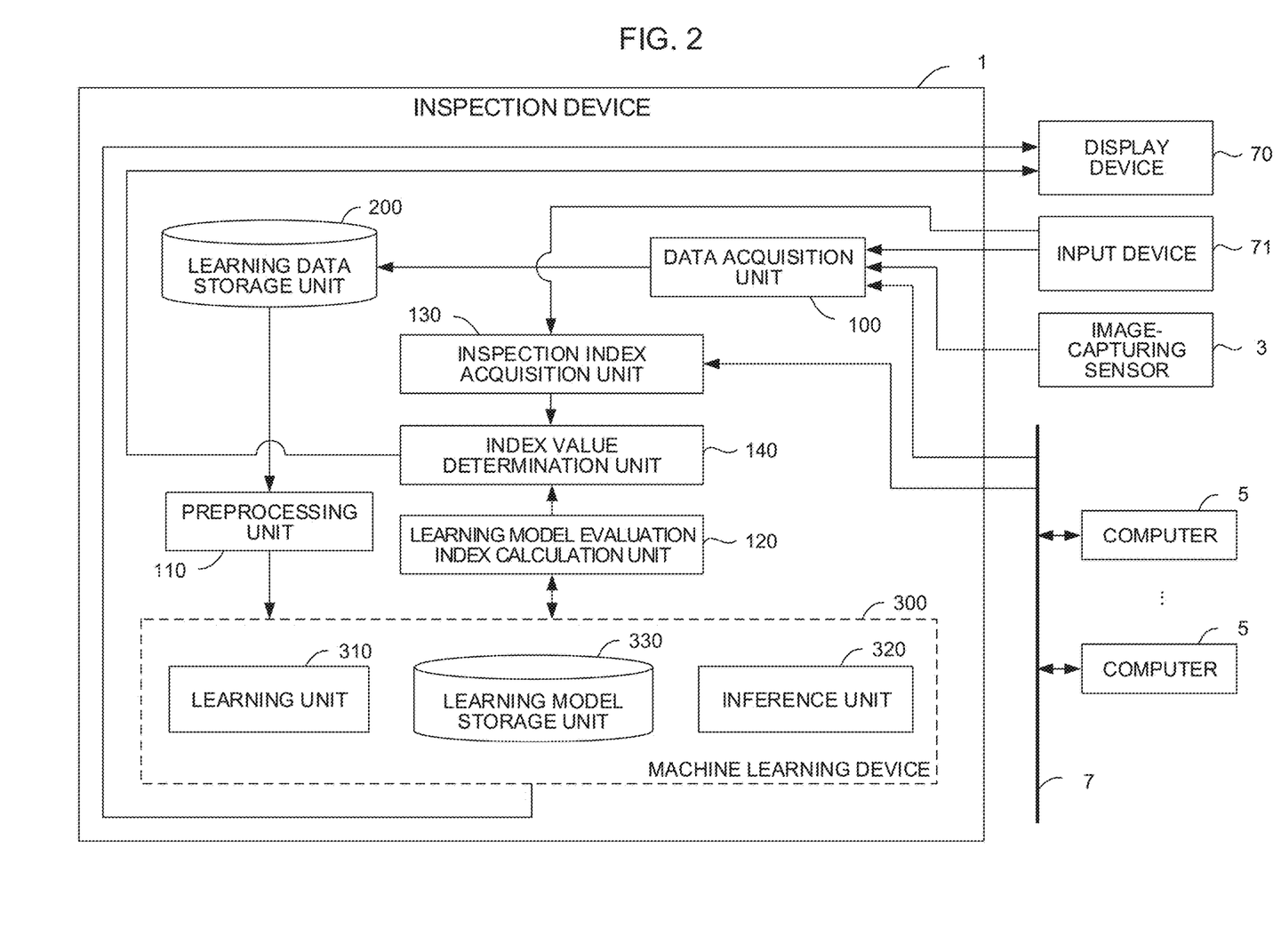
FIG. 2 is a schematic function block diagram of the inspection device according to the embodiment.

FIG. 2 is a schematic function block diagram of the inspection device 1 according to the embodiment. The respective functions of function blocks illustrated in FIG. 2 are realized when the CPU 11 provided in the inspection device 1 and the processor 301 of the machine learning device 300 illustrated in FIG. 1 perform their system programs to control the operations of the respective units of the inspection device 1 and the machine learning device 300.

The inspection device 1 of the present embodiment includes a data acquisition unit 100, a preprocessing unit 110, a learning model evaluation index calculation unit 120, an inspection index acquisition unit 130, and an index value determination unit 140. The machine learning device 300 provided in the inspection device 1 includes a learning unit 310, and an inference unit 320. Further, on the non-volatile memory 14, a learning data storage unit 200 that stores data for learning and inference performed by the machine learning device 300 is provided. On the non-volatile memory 304 of the machine learning device 300, a learning model storage unit 330 that stores a learning model constructed by machine learning performed by the learning unit 310 is provided.

The data acquisition unit 100 is a function unit that acquires various data input from the image-capturing sensor 3, the input device 71, other computers 5, or the like. The data acquisition unit 100 acquires, for example, image data on an inspection target captured by the image-capturing sensor 3 and stores the acquired image data in the learning data storage unit 200. Further, the data acquisition unit 100 acquires various data such as label data indicating a result obtained when an operator visually inspects the inspection target and learning data (image data on an inspection target and the label of an inspection result of the inspection target) acquired from the other computers 5 and stores the acquired various data in the learning data storage unit 200. The data acquisition unit 100 may acquire data from an external storage device not illustrated.

The preprocessing unit 110 generates, on the basis of learning data stored in the learning data storage unit 200, training data T that is the combination of state data S and label data L for learning in the machine learning device 300. The preprocessing unit 110 generates the state data S and the label data L by converting (performing the digitization, normalization, sampling, or the like of) the acquired data into a unified form that can be handled by the machine learning device 300.

The state data S generated by the preprocessing unit 110 includes at least inspection target image data S1 acquired when an image of an inspection target is captured. The inspection target image data S1 may be, for example, array data on pixel values of pixels constituting an image obtained by capturing an image of an inspection target.

Further, the label data L generated by the preprocessing unit 110 includes at least inspection result data L1 including the label of an inspection result of an inspection target. The inspection result data L1 may be, for example, a label indicating a result obtained when an operator visually inspects an inspection target.

The learning unit 310 performs supervised learning using the state data S and the label data L generated by the preprocessing unit 110. The learning unit 310 is a function unit that generates (learns) a learning model that has learned an inspection result of an inspection target with respect to image data on the inspection target. The learning unit 310 of the present embodiment may be configured to perform, for example, supervised learning using a neural network as a learning model. When the learning unit 310 is configured like this, the learning model may be a neural network including the three layers of an input layer, an intermediate layer, and an output layer. Further, the learning model may be a neural network including three or more layers. That is, the learning unit 310 may use deep learning as a method. By using deep learning, the learning unit 310 is allowed to perform more effective learning and reasoning. The learning model generated by the learning unit 310 is stored in the learning model storage unit 330 provided on the non-volatile memory 304. Further, the learning model is used for performing the inference processing of an inspection result based on image data on an inspection target by the inference unit 320.

The inference unit 320 performs, on the basis of the state data S input from the preprocessing unit 110, the inference of an inspection result of an inspection target using a learning model stored in the learning model storage unit 330. In the inference unit 320, the state data S (the inspection target image data S1) input from the preprocessing unit 110 is input as input data to a learning model (in which parameters have been determined) generated by supervised learning by the learning unit 310. Thus, the inspection result of the inspection target is estimated (calculated). The inspection result of the inspection target estimated by the inference unit 320 is output to, for example, the display device 70 via the interface 18. Further, the inspection result of the inspection target may be output to, for example, the computer 5 such as a host computer and a cloud computer via the network 7 to be used.

Figure 3:
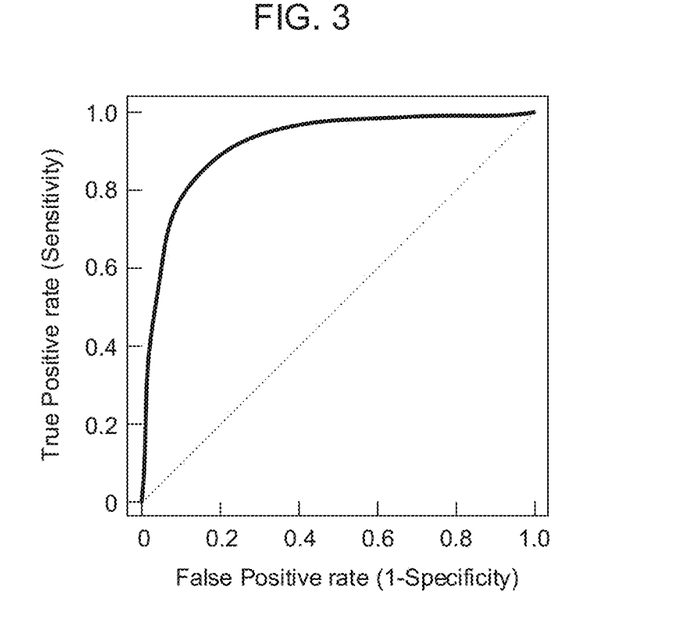
FIG. 3 is a diagram showing an example of an ROC curve.

The learning model evaluation index calculation unit 120 is a function unit that calculates a learning model evaluation index for evaluating a learning model stored in the learning model storage unit 330. The learning model evaluation index calculation unit 120 performs a receiver operating characteristic (ROC) analysis, for example, on a learning model stored in the learning model storage unit 330 and generates an ROC curve as a learning model evaluation index. In FIG. 3, a vertical axis indicates a true positive rate (a probability that positivity is accurately predicted), and a horizontal axis indicates a false positive rate (a probability that negativity is falsely predicted as positivity). The ROC curve is a curve (a solid line drawn by a thick line in FIG. 3) drawn when the threshold of an output value of a learning model that estimates an inspection target as being positive is changed when an inspection is performed by a certain learning model. The learning model evaluation index calculation unit 120 may evaluate a learning model using learning data (the state data S and the label data L) not being used to learn the learning model among the learning data stored in the learning data storage unit 200. Note that although an example in which the ROC curve is used is described in the present embodiment, an index for evaluating a learning model other than the ROC curve may be used in the inspection device 1.

The learning model evaluation index calculation unit 120 may evaluate a learning model every time the learning unit 310 performs learning a predetermined number of times. Further, the learning model evaluation index calculation unit 120 may store the back up of a learning model that has been evaluated in the learning model storage unit 330 together with an evaluation result of the learning model. For example, when a learning model is designed to be evaluated every 1,000 learning cycles in advance, the learning model evaluation index calculation unit 120 calculate a learning model evaluation index every 1,000 learning cycles such as when learning is performed 1,000 times, 2,000 times, 3,000 times, or the like. The learning model evaluation index calculation unit 120 stores the learning models and the learning model evaluation indexes at each point in the learning model storage unit 330 so as to be associated with each other (separately from a learning model that successively performs learning).

The inspection index acquisition unit 130 is a function unit that acquires an inspection index used on an inspection site by the inspection device 1. The inspection index acquisition unit 130 may acquire, for example, an inspection index value input by an operator via the input device 71. The inspection index acquisition unit 130 may acquire, via the network 7, an inspection index from the computer 5 such as a host computer in which information on a production plan in a factory or the like is managed. Examples of an inspection index acquired by the inspection index acquisition unit 130 include a limit defective product shipping rate, a limit re-inspection rate, or the like.

The index value determination unit 140 is a function unit that determines whether each learning model satisfies an inspection index on the basis of a learning model evaluation index calculated by the learning model evaluation index calculation unit 120 and an inspection index acquired by the inspection index acquisition unit 130. Further, the index value determination unit 140 outputs a result of the determination. The index value determination unit 140 determines whether a learning model satisfies an inspection index using, for example, a value calculated as a result of substituting a learning model evaluation index and the inspection index into a preset index value determination formula.

Figure 4:
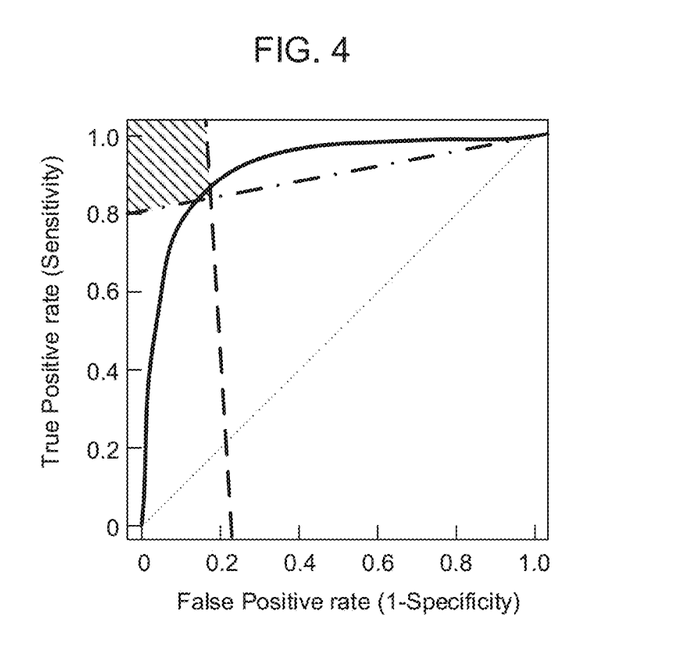
FIG. 4 is a diagram describing the relationship between the ROC curve, a limit defective product shipping rate, and a limit re-inspection rate.

A case in which an ROC curve is used as a learning model evaluation index and a limit defective product shipping rate and a limit re-inspection rate are used as inspection indexes in the determination processing of the index value determination unit 140 will be described. FIG. 4 is a graph in which limit lines satisfying a limit defective product shipping rate and a limit re-inspection rate are plotted with respect to an ROC curve. In FIG. 4, a chain line drawn by thick lines is obtained by plotting values calculated according to the following Formula (1) on the graph on the basis of the limit defective product shipping rate. A region on the upper side of the chain line shows a region in which the limit defective product shipping rate is satisfied. Note that a manufacturing defective rate is assumed to be known in advance on the basis of past statistics or the like.

$$F(f)=1-\{d\times(1-m)\times(1-f)\}/\{m\times(1-d)\} \quad (1)$$

f: False positive rate
d: Limit defective product shipping rate
m: Manufacturing defective rate Meanwhile, in FIG. 4, a broken line drawn by thick lines is obtained by plotting values calculated according to the following Formula (2) on the graph on the basis of the limit re-inspection rate. A region on the left side of the broken line shows a region in which the limit re-inspection rate is satisfied. Note that a manufacturing defective rate is assumed to be known in advance on the basis of past statistics.

$$G(t)=\{r-(m\times t)\}/(1-m) \quad (2)$$

t: True positive rate
r: Limit re-inspection rate
m: Manufacturing defective rate That is, if a learning model has an ROC curve entering a hatched region in FIG. 4, a threshold corresponding to a portion entering the region (the threshold of an output value of the learning model that estimates an inspection target as being positive, i.e., a defective product) is set and used, whereby the learning model may be used as one satisfying required specifications fixed as inspection indexes. The index value determination unit 140 determines whether an ROC curve calculated for each learning model has a portion entering a region on the upper side of the line calculated according to Formula (1) and on the left side from the line calculated according to Formula (2). When determining that the ROC curve has the portion entering the region on the upper side of the line calculated according to Formula (1) and on the left side from the line calculated according to Formula (2), the index value determination unit 140 may determine that the learning model is one satisfying required specifications fixed as inspection indexes and output a determination result of the determination to the display device 70. Further, the index value determination unit 140 may output the determination result to the computer 5 such as a host computer and a cloud computer via the network 7. Further, the index value determination unit 140 may provide instructions for ending learning to the units of the inspection device 1 when determining that a learning model stored in the learning model storage unit 330 satisfies required specifications fixed as inspection indexes. Further, when determining that a learning model stored in the learning model storage unit 330 satisfies required specifications fixed as inspection indexes, the index value determination unit 140 may instruct to display a message to urge an input indicating whether to continue or end learning on the display device 70 and then determine whether to continue or end the learning on the basis of the input.

In addition, the index value determination unit 140 may output a condition under which a learning model is used in a state in which required specifications fixed as inspection indexes are satisfied to the display device 70 or the computer 5. In the above example, when a learning model determined to satisfy required specifications fixed as inspection indexes is used, a threshold corresponding to a portion in which an ROC curve enters the hatched region in FIG. 4 (the threshold of an output value of the learning model estimating an inspection target as being positive, i.e., a defective product) is required to be set and used. The index value determination unit 140 may output the range of the threshold to the display device 70 or the computer 5 as a condition for using the learning model. In the range of the threshold, a value corresponding to a point at which the ROC curve crosses the chain line drawn by the thick lines becomes an upper limit value, and a value corresponding to a point at which the ROC curve crosses the broken line drawn by the thick lines becomes a lower limit value. Generally, the ROC curve is a line rising in an upper right direction. Therefore, the re-inspection rate becomes lower toward the upper limit value, and the defective product shipping rate becomes lower toward the lower limit value. The index value determination unit 140 may also output this information.

In the inspection device 1 including the above configurations, a learning model is evaluated on the basis of required specifications fixed as inspection indexes. Therefore, in the learning process of the machine learning device 300, even an operator on site having no knowledge about machine learning is allowed to determine whether learning has been performed to satisfy required specifications fixed as currently-set inspection indexes. As a result, the operator is allowed to easily select an appropriate learning model.

The embodiment of the present disclosure is described above. However, the present disclosure is not limited to the example of the above embodiment and may be performed in various aspects with the addition of appropriate modifications.

For example, in the above embodiment, the inspection device 1 is described using an example of a shipping propriety determination through an appearance inspection. However, the inspection device 1 may be appropriately applied to other inspections. For example, the inspection device 1 may be applied to an inspection for determining a possibility of machining with a machine tool, or the like. In this case, the inspection device 1 may be configured to output, on the basis of temperature, vibration, sound, or the like at the time of the machining of the targeted machine, a score (a low score indicates that the operation of the machine tool is good, and a high score indicates that the machine tool is faulty or put into a state close to a fault) indicating the fault degree of the machine tool. At this time, in an ROC curve diagram generated by the inspection device 1, a defective machine correct answer rate is set in a vertical axis, and a good movable machine incorrect answer rate is set in a horizontal axis. As inspection indexes handled by the inspection device 1, it is sufficient to use, for example, a limit defective machining rate indicating the rate of defective machines practically allowed to be included in a group of machine tools determined to be normal and to be used in machining and a limit maintenance rate indicating the rate of machine tools determined to be abnormal and subjected to maintenance. By the setting of the parameters as described above, an appropriate learning model used in a scene to diagnose whether a machine tool is faulty is easily selected like the above embodiment.

Further, in the above embodiment, the index value determination unit 140 determines that a learning model of which the ROC curve is determined to enter the hatched region in FIG. 4 is one satisfying required specifications fixed as inspection indexes. For example, the index value determination unit 140 may determine that a learning model is one satisfying required specifications fixed as inspection indexes when the area of a portion surrounded by the chain line drawn by the thick lines, the broken line drawn by the thick lines, and the ROC curve in FIG. 4 exceeds a predetermined threshold set in advance.

The invention claimed is:

1. An inspection device configured to perform an inspection of an inspection target, the inspection device comprising:
a processor configured to
perform machine learning on a basis of state data acquired from the inspection target and label data indicating an inspection result related to the inspection target to generate a learning model;
calculate a learning model evaluation index related to the learning model as an evaluation index to be used to evaluate the learning model;
acquire an inspection index to be used in the inspection; and
determine whether the learning model satisfies the inspection index on a basis of the learning model evaluation index and the inspection index and output a result of a determination,
wherein
the inspection index includes
a limit defective product shipping rate that indicates a rate of defective products allowed to be included in inspection targets to be shipped, and
a limit re-inspection rate that indicates a rate of inspection targets excluded as a result of inspection to a total number of the inspection targets, and
the processor is configured to
determine a range by overlapping a region in which the limit defective product shipping rate is satisfied and a region in which the limit re-inspection rate is satisfied, and
in response to the learning model evaluation index related to the learning model is within the range, determine that the learning model satisfies the inspection index, and wherein the learning model evaluation index includes a receiver operating characteristic (ROC) curve relating to the learning model.

2. The inspection device according to claim 1, wherein, when determining whether the learning model satisfies the inspection index, the processor is configured to calculate a condition under which the learning model satisfies the inspection index and output the calculated condition under which the learning model satisfies the inspection index.

3. An inspection device configured to perform an inspection of an inspection target, the inspection device comprising:
a processor configured to
perform machine learning on a basis of state data acquired from the inspection target and label data indicating an inspection result related to the inspection target to generate a learning model;
calculate a learning model evaluation index related to the learning model as an evaluation index to be used to evaluate the learning model;
acquire an inspection index to be used in the inspection; and
determine whether the learning model satisfies the inspection index on a basis of the learning model evaluation index and the inspection index and output a result of a determination,
wherein
the inspection index includes
a limit defective machining rate that indicates a rate of defective machines allowed to be included in a group of machine tools that are determined to be normal and are to be used in machining and
a limit maintenance rate that indicates a rate of machine tools determined to be abnormal and subjected to maintenance, and
the processor is configured to determine a range by overlapping a region in which the limit defective product machining rate is satisfied and a region in which the limit maintenance rate is satisfied, and in response to the learning model evaluation index related to the learning model is within the range, determine that the learning model satisfies the inspection index, and wherein the learning model evaluation index includes a receiver operating characteristic (ROC) curve relating to the learning model.

4. A machine learning method comprising:

performing machine learning on a basis of state data acquired from an inspection target and label data indicating an inspection result related to the inspection target to generate a learning model;

calculating a learning model evaluation index related to the learning model as an evaluation index to be used to evaluate the learning model;

acquiring an inspection index to be used in an inspection; and determining whether the learning model satisfies the inspection index on a basis of the learning model evaluation index and the inspection index and outputting a result of a determination, wherein the inspection index includes a limit defective product shipping rate that indicates a rate of defective products allowed to be included in inspection targets to be shipped, and a limit re-inspection rate that indicates a rate of inspection targets excluded as a result of inspection to a total number of the inspection targets, the machine learning method further comprises determining a range by overlapping a region in which the limit defective product shipping rate is satisfied and a region in which the limit re-inspection rate is satisfied, and in response to the learning model evaluation index related to the learning model is within the range, determining that the learning model satisfies the inspection index, and wherein the learning model evaluation index includes a receiver operating characteristic (ROC) curve relating to the learning model.

* * * * *